Figure 1:
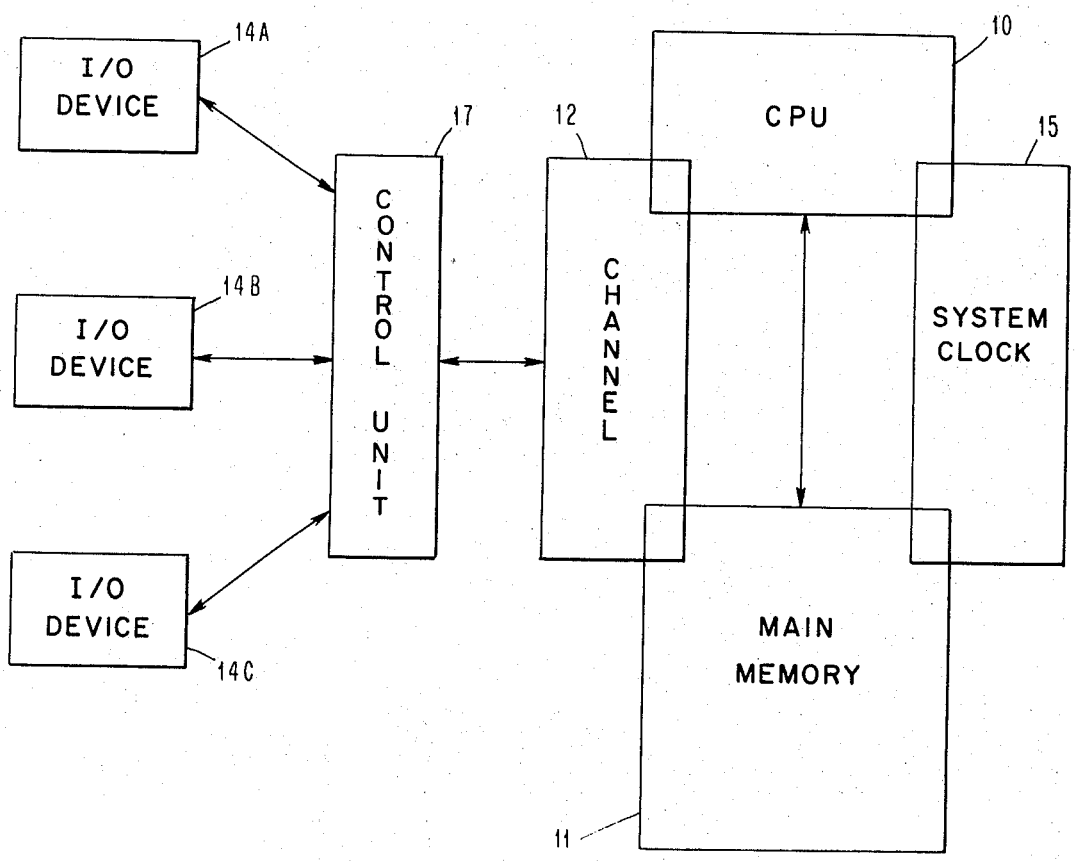
Figure 2A:
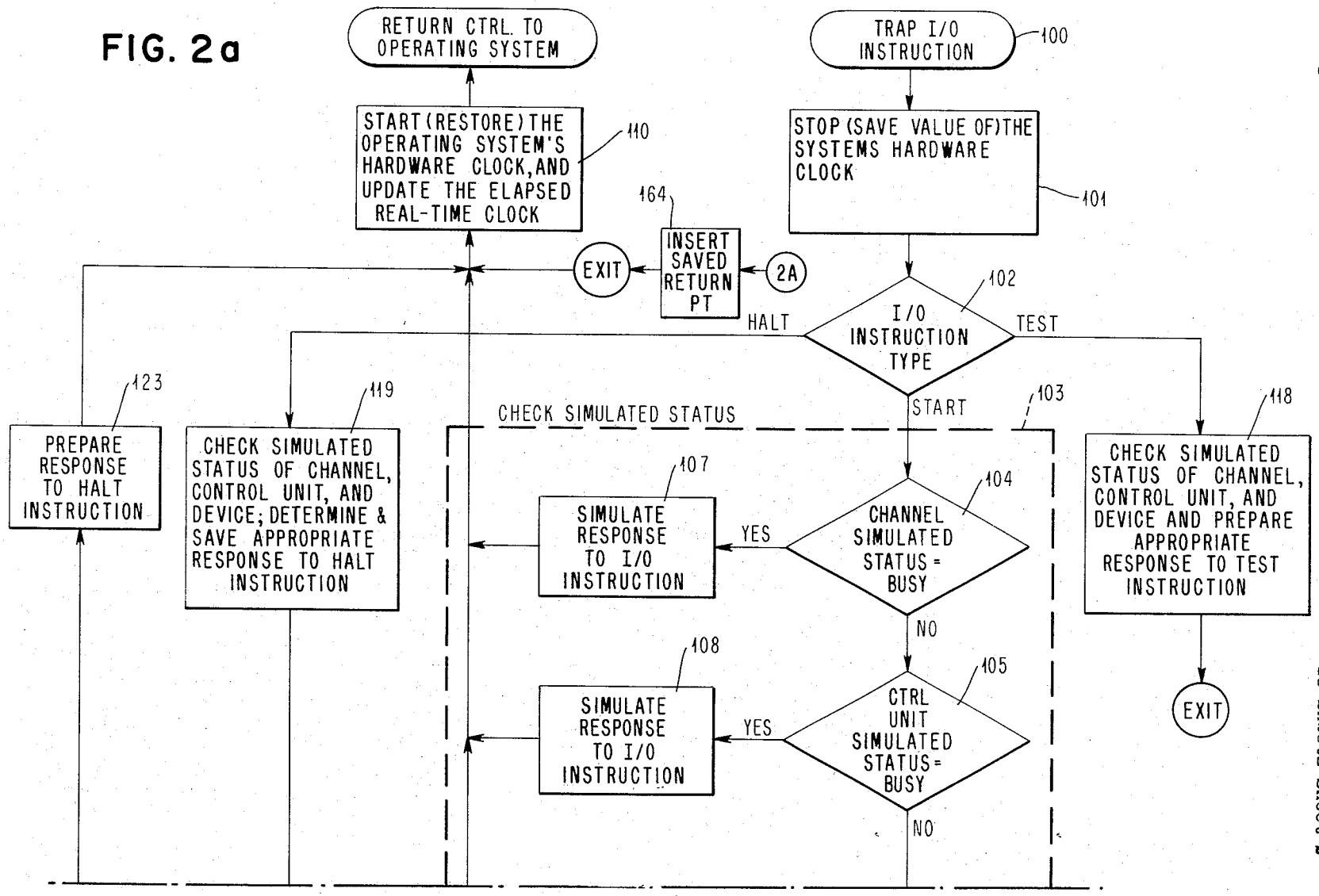
Figure 2B:
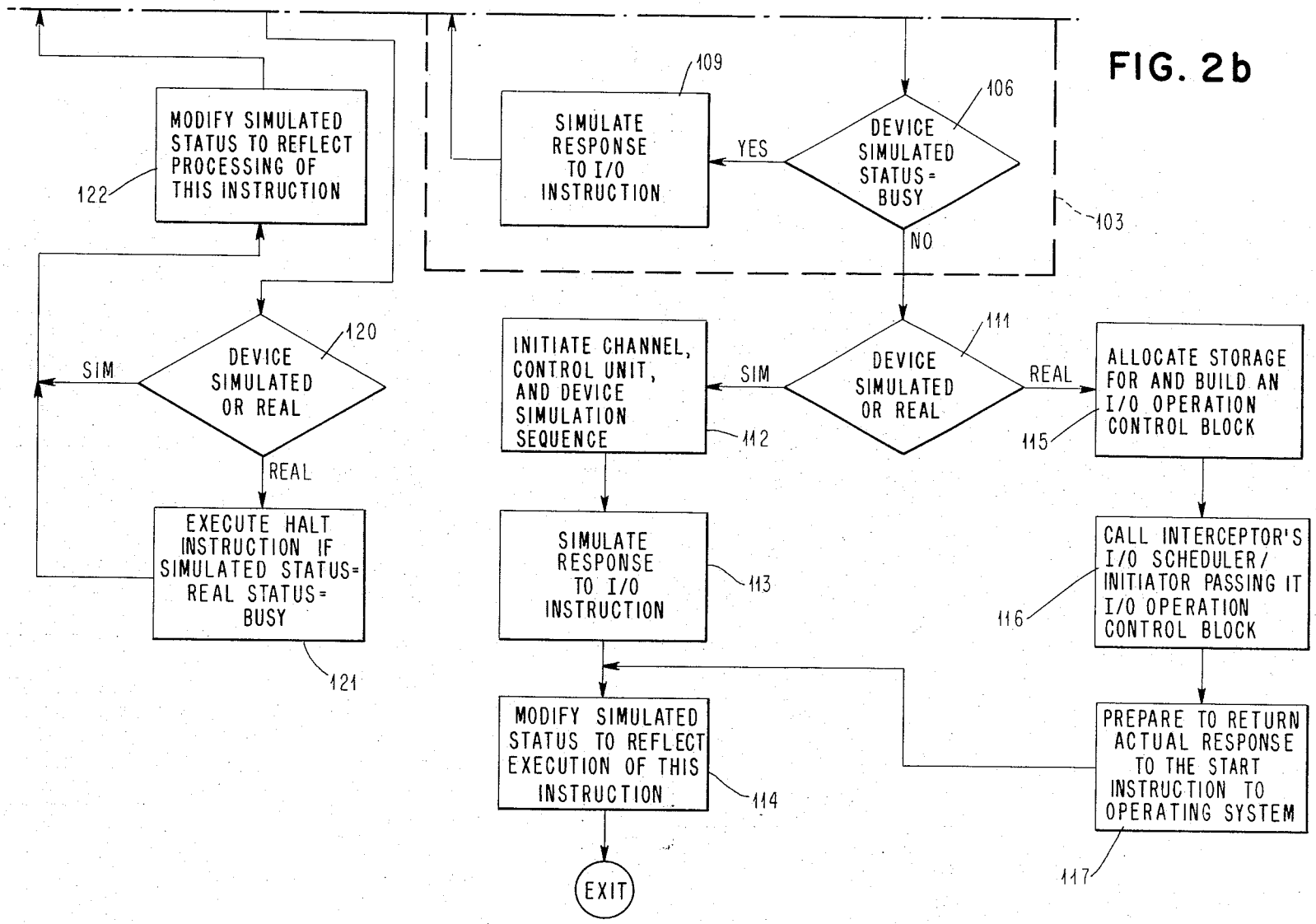
Figure 3A:
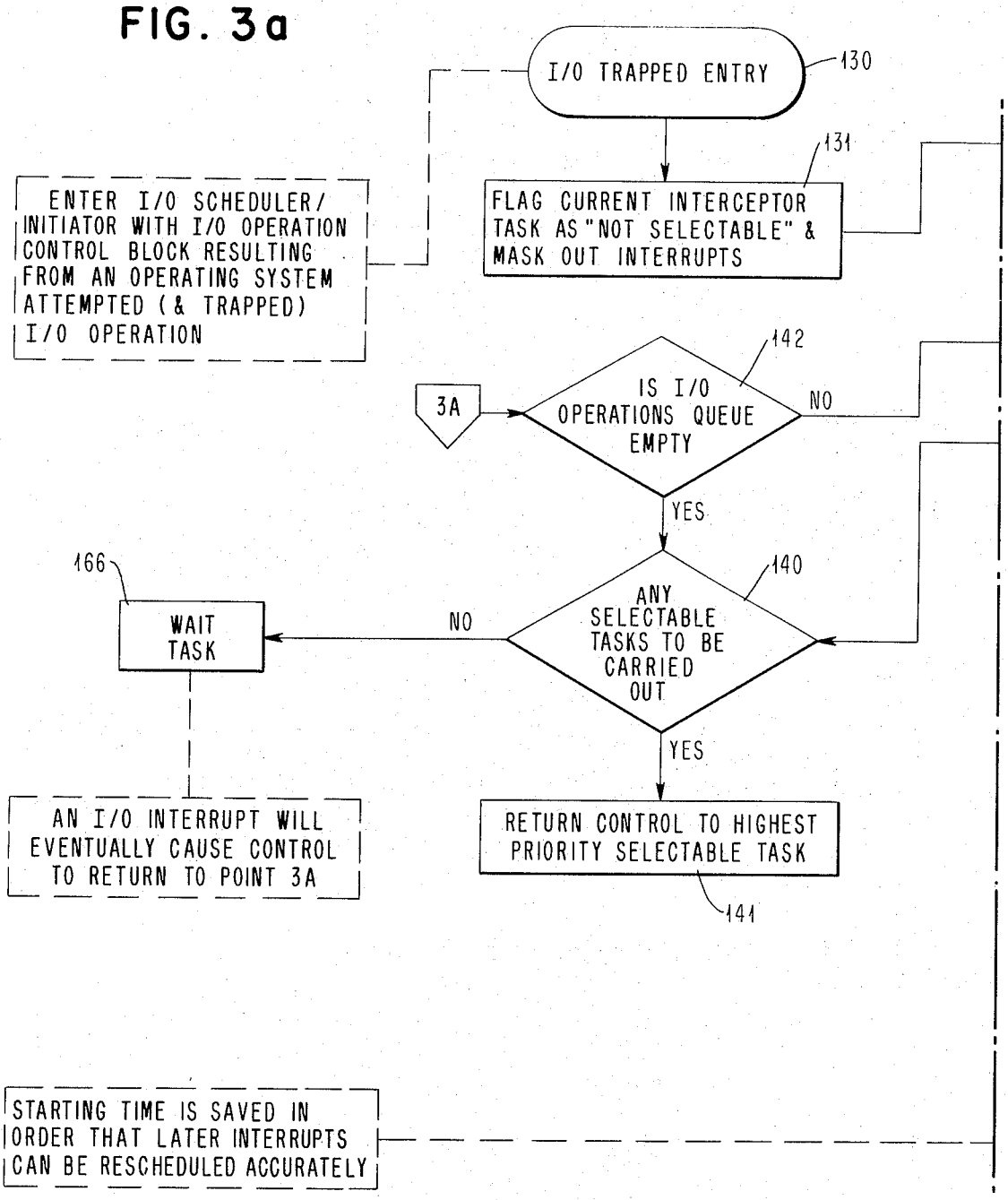
Figure 3B:
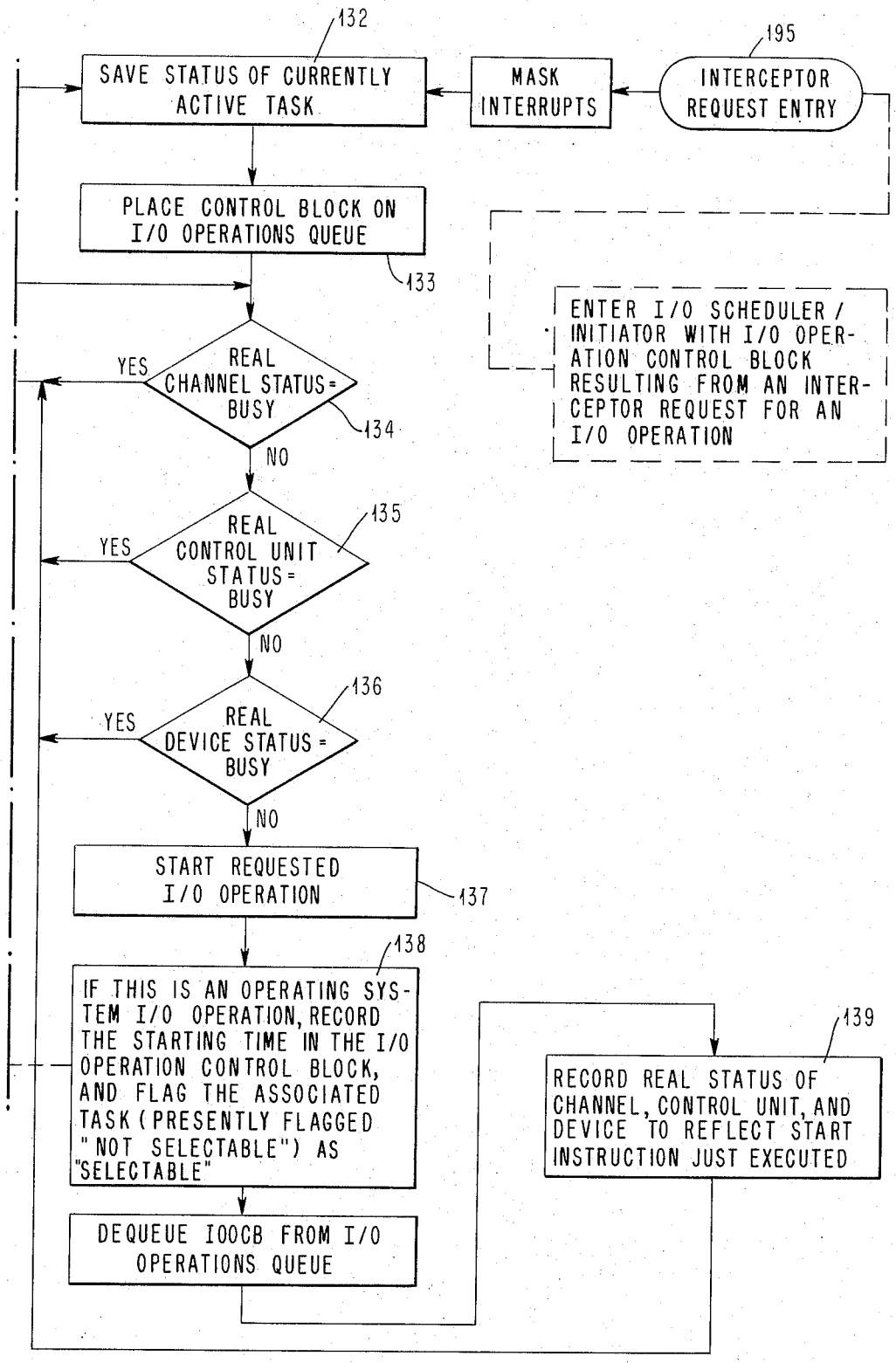
Figure 4A:
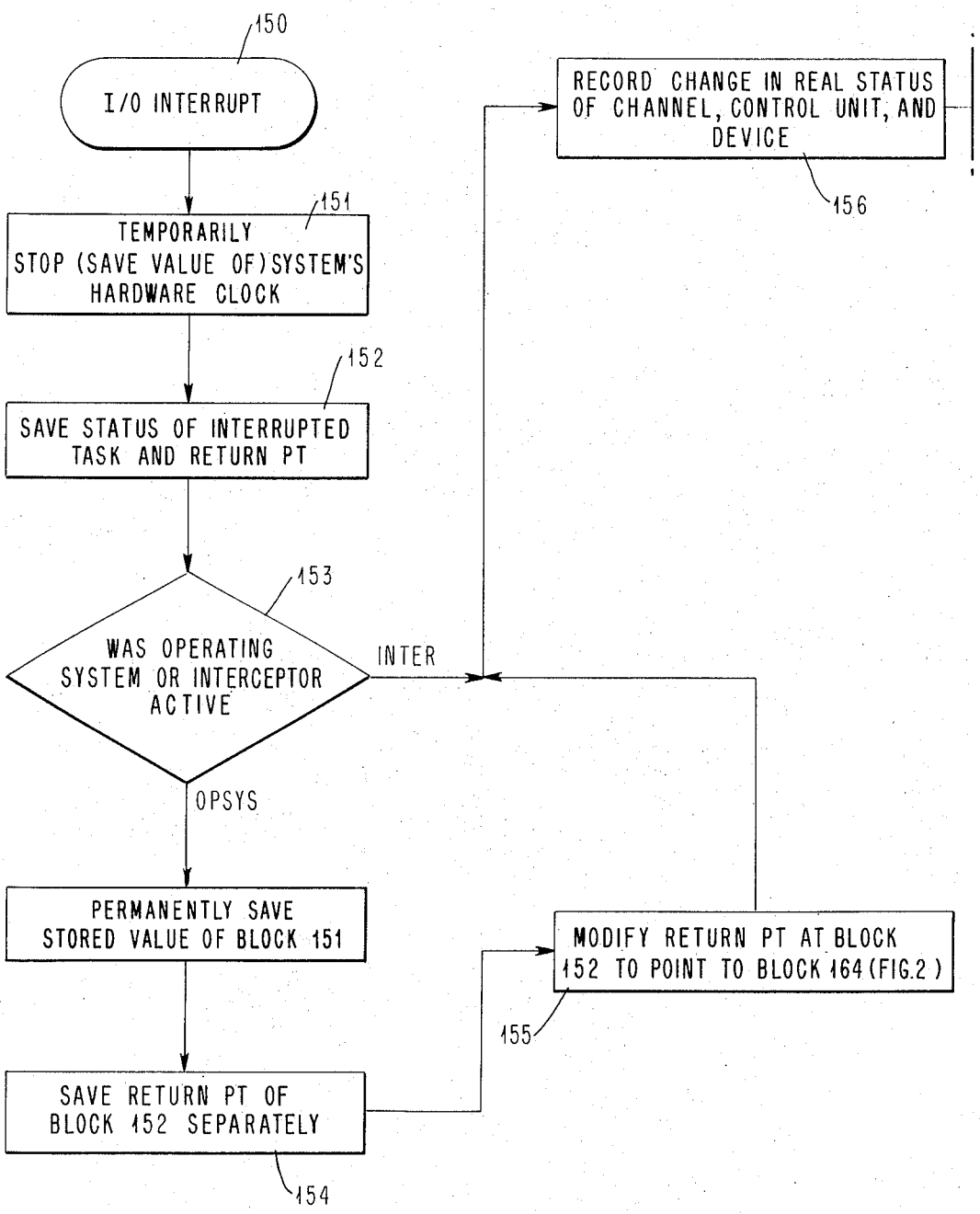
Figure 4B:
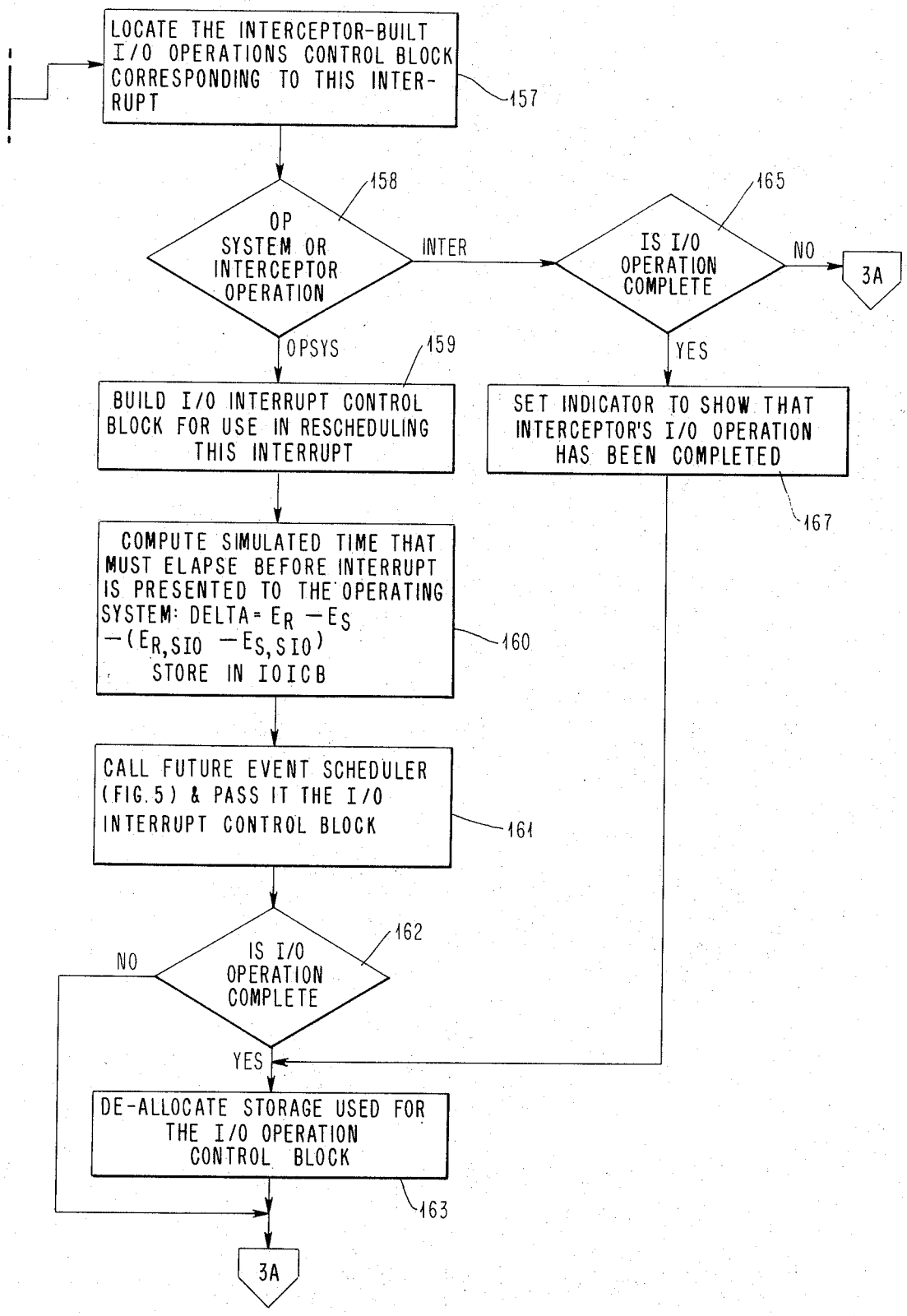
Figure 5:
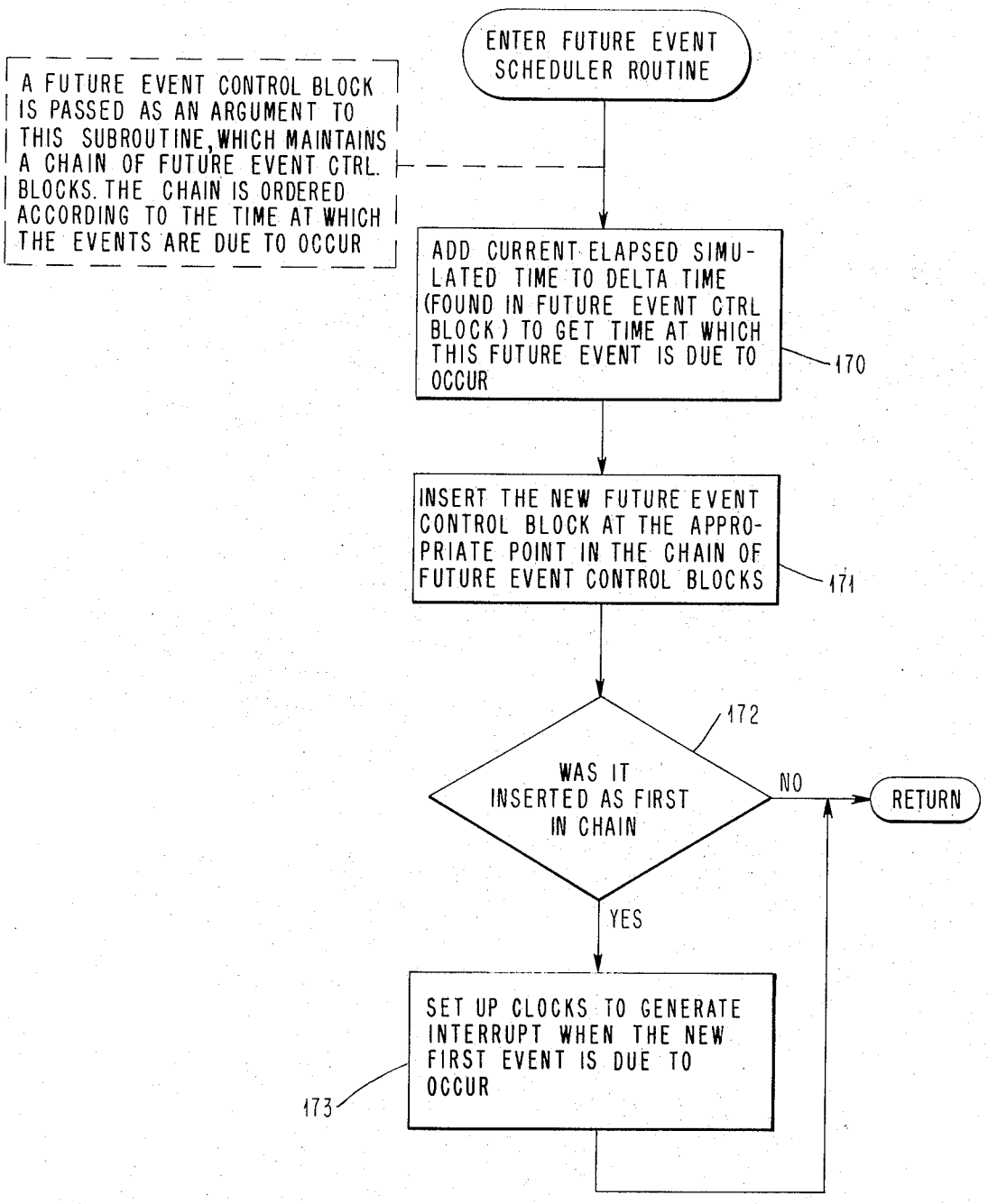
Figure 6:
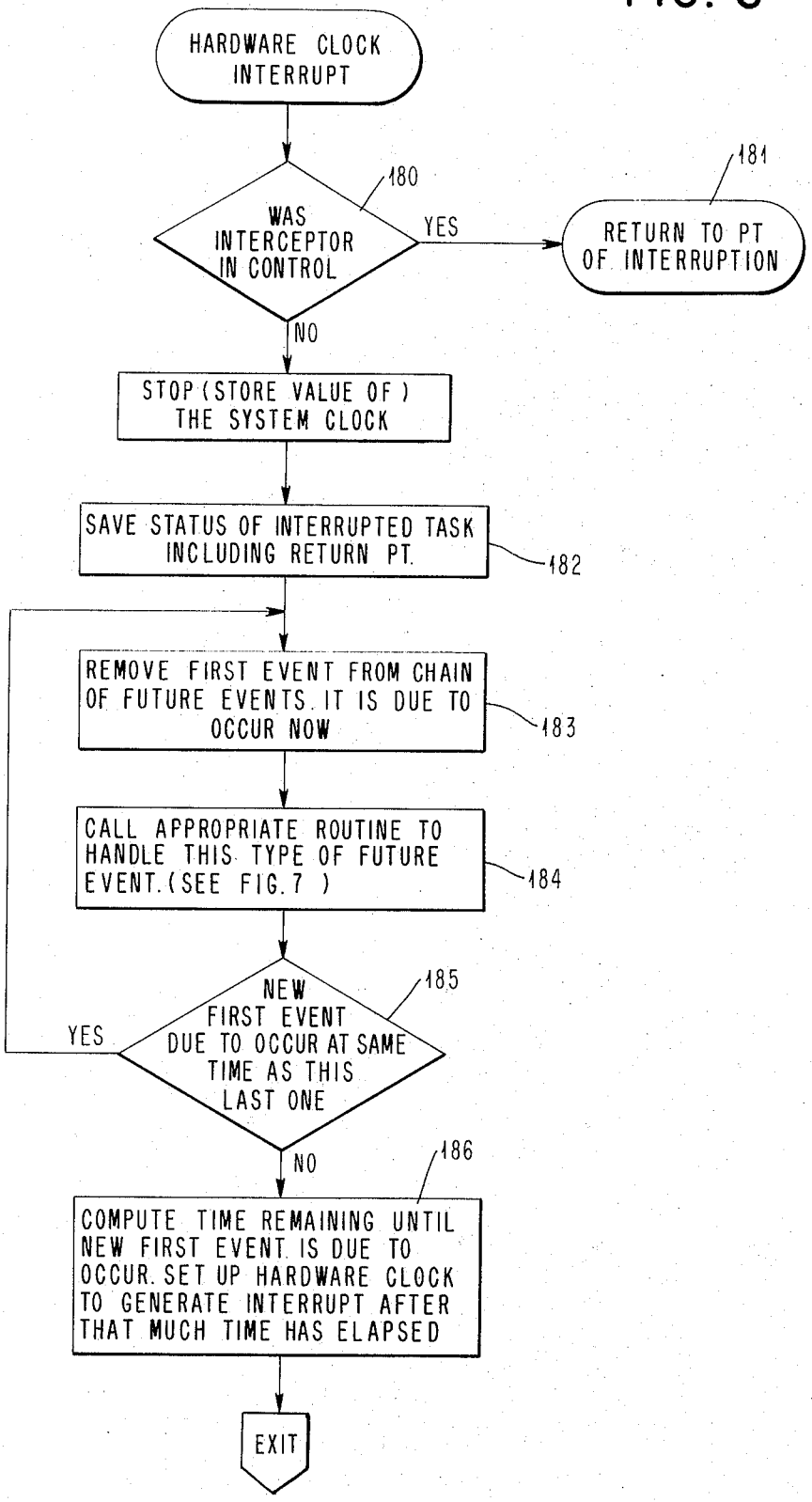
Figure 7:
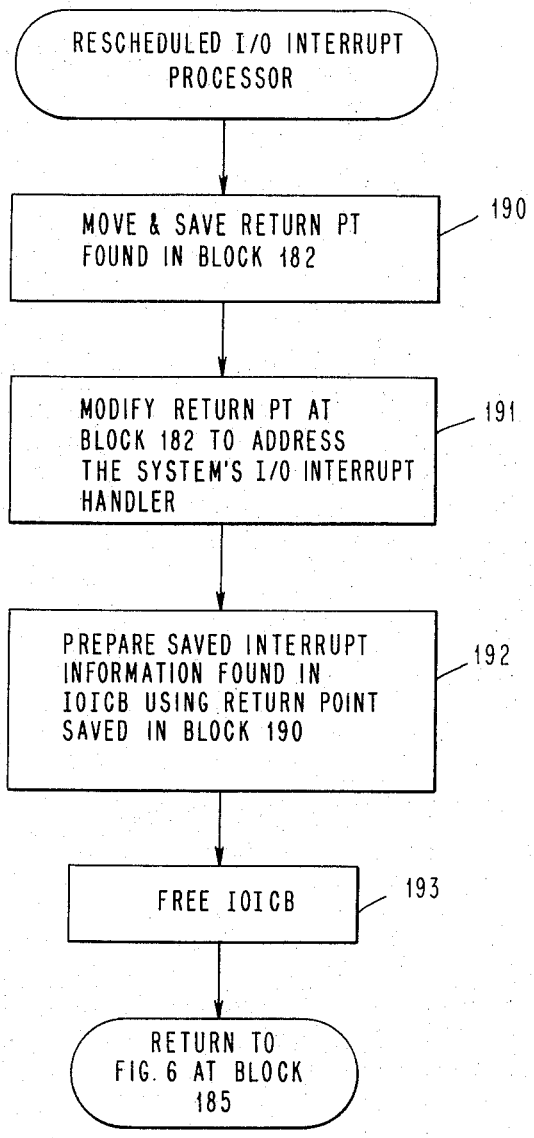

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 22, 1974

918 O.G. 1330

T918,015

RESCHEDULING OF I/O INTERRUPTS

Gerald A. Davison, Poughkeepsie, and Edward J. Nauss, Millbrook, N.Y., assignors to International Business Machines Corporation, Armonk, N.Y.

Continuation of application Ser. No. 218,743, Jan. 18, 1972. This application July 25, 1973, Ser. No. 382,431

Int. Cl. G06f *7/00*

U.S. Cl. 444—1

13 Sheets Drawing. 32 Pages Specification

To evaluate computer system performance, software techniques are frequently used to collect data on the system as it runs, and/or to simulate new devices. However, data collecting, simulating and report writing procedures degrade the performance of the system on which they are run and therefore provide distorted results. The technique herein is designed to hide the overhead procedure from the performance of the system by using prior art procedures in stopping the system clock whenever an overhead program is being executed, and adding to that a technique for compensating for distortion in the I/O area by intercepting and rescheduling I/O interrupts to compensate for the "stolen" time during which the system clock is stopped.

The procedure involves the interception of all I/O instructions issuing from the CPU to the channel and interception of all I/O interrupts from the channel in order to reschedule their presentation to the operating system. This is accomplished by measuring the length of time that it takes for the I/O operation to be performed and, by adding to that time any "stolen" time taken from the operating system during the period in which the I/O operation was outstanding, the presentation of the interrupt may be delayed an appropriate time. Provision is made for scheduling the interrupt in accordance with the above calculation, and provision is also made for further delaying the interrupt if additional time is taken between initial rescheduling and final presentation.

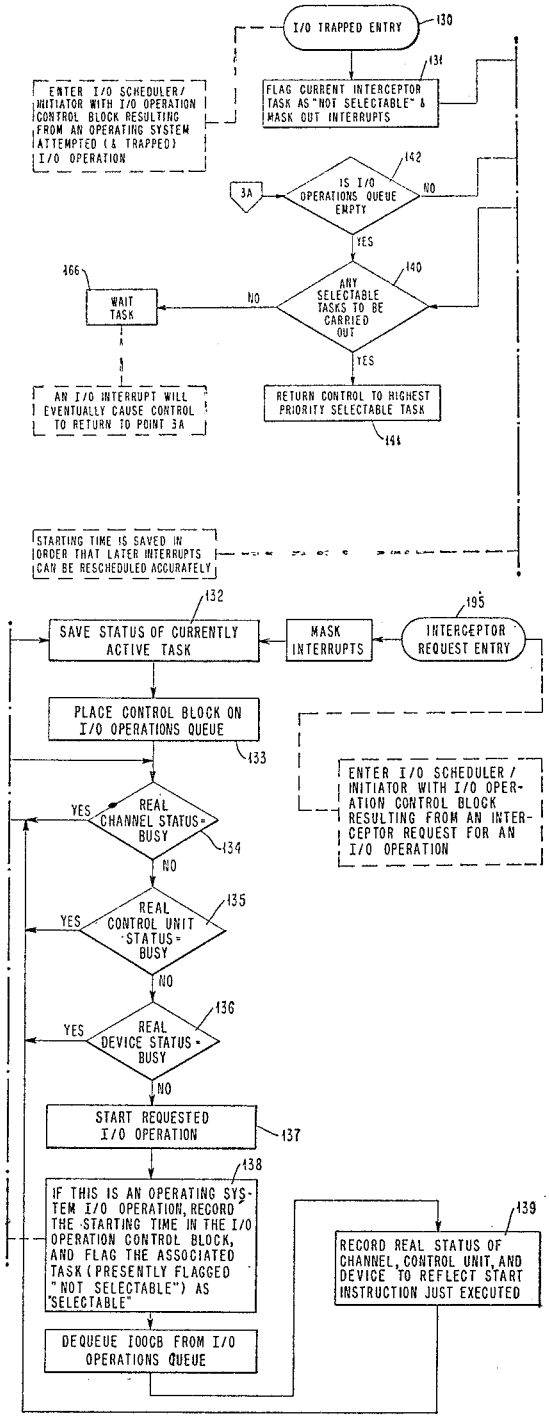

RESCHEDULING OF I/O INTERRUPTS

Original Filed Jan. 18, 1972 13 Sheets-Sheet 1

RESCHEDULING OF I/O INTERRUPTS

Original Filed Jan. 18, 1972 13 Sheets-Sheet 2

FIG. 8

IOICB

| | | |
|---|---|---|
| TEBCHN X'00' | USED FOR CHAINING BLOCKS TOGETHER | |
| TEBTME CONTAINS DELTA TIME WHEN BUILT, LATER CONTAINS SIMULATED TIME OF INTERRUPT | | |
| TEBRTN ADDRESS OF ROUTINE TO PROCESS EVENT WHEN IT OCCURS | | |
| IOICBCSW CSW FOR I/O INTERRUPT | | |
| CSW (CONTINUED) | | |
| IOICBDVC UNIT ADDRESS OF INTERRUPTING DEVICE | IOICBFB FLAGS | NOT USED |
| | | |

FIG. 9A

IOOCB (FORMAT FOR OS OPERATION FROM TRAPPED SIO)

| | | |
|---|---|---|
| CPCBCHN RESERVED FOR I/O SCHEDULER TO CHAIN IOICB'S TOGETHER | | |
| NOT USED | CPCBFLGS FLAGS | NOT USED |
| CPCBCAW I/O PROTECT KEY | CHANNEL PROGRAM ADDRESS | |
| CPCBRTIM VALUE OF REAL TIME CLOCK AT SIO - VALUE OF SIMULATED TIME CLOCK AT SIO ($E_{R,SIO}-E_{S,SIO}$) | | |
| | | |

FIG. 9B

IOOCB (FORMAT FOR INTERCEPTOR I/O OPERATIONS)

<table>
<tr><td colspan="3">CPCBSENS<br>CPCBCHN<br>SENSE DATA</td></tr>
<tr><td colspan="2">SENSE DATA</td><td>CPCBFLGS<br>FLAGS</td><td>CPCBECB<br>RELATIVE ECB<br>NUMBER</td></tr>
<tr><td>CPCBCAW<br>I/O PROTECT<br>KEY</td><td colspan="3">CHANNEL PROGRAM ADDRESS</td></tr>
<tr><td colspan="4">CPCBCSW<br>CSW</td></tr>
<tr><td colspan="4">CSW</td></tr>
<tr><td>CPCBPCI<br>NOT USED</td><td colspan="3">PCI APPENDAGE ROUTINE ADDRESS<br>(OPTIONAL)</td></tr>
<tr><td colspan="4"></td></tr>
</table>

FIG. 10

DVCB (DEVICE CONTROL BLOCK)

<table>
<tr><td>DVCBCHN<br>X'00'</td><td colspan="3">POINTER TO LCB OR IOOCB</td></tr>
<tr><td colspan="2">DVCBUNAD<br>UNIT ADDRESS</td><td colspan="2">DVCBFLGS<br>FLAGS</td></tr>
<tr><td>DVCBCOCB<br>COCB<br>POINTER</td><td>DVCBROT<br>ROTATION TIMING<br>POINTER</td><td colspan="2">DVCBHASH<br>HASH POINTER</td></tr>
<tr><td colspan="4">BELOW IS AN ALTERNATE FORMAT OF THE DVCBCHN FIELD</td></tr>
<tr><td>X'FF'</td><td colspan="2">NOT USED</td><td>DVCBECB<br>RELATIVE ECB<br>NUMBER</td></tr>
</table>

FIG. 11

CHCB
(CHANNEL CONTROL BLOCK)

| | | | |
|---|---|---|---|
| CHCBPEND X'00' | POINTER TO 1ST PENDING IOICB | | |
| CHCBFLGS FLAGS | CHCBSIMB CHANNEL SIMULATED BUSY | CHCBOS SIMULATED BUSY, REALLY BUSY, OS INTERRUPT EXPECTED, OS USED LAST | CHCBTPD REALLY BUSY, INTERCEPTOR USED LAST |
| CHCBQLEN CHANNEL QUEUE LENGTH | CHCBSM SYSTEM MASK BIT FOR CHANNEL | CHCBCUB CONTROL UNIT BLOCKAGE COUNT | |
| CHCBQ CHANNEL QUEUE ENTRY NUMBER OF QUEUE ENTRIES = ONE FOR OS + ONE FOR EACH INTERCEPTOR DEVICE | | | |

FIG. 12

COCB
(CONTROL UNIT CONTROL BLOCK)

| | | |
|---|---|---|
| COCBLBID POINTER TO A CHAIN OF IOICB'S FOR LOCKED BID KEYS | | |
| COCBFLGS FLAGS | COCBBASE CONTROL UNIT BASE ADDRESS | COCBFLGX FLAGS |